US008712803B1

(12) United States Patent
Buentello

(10) Patent No.: US 8,712,803 B1
(45) Date of Patent: Apr. 29, 2014

(54) SYSTEMS AND METHODS FOR ELECTRONIC VERIFICATION OF VEHICLE INSURANCE COVERAGE

(75) Inventor: Andre Rene Buentello, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 419 days.

(21) Appl. No.: 11/869,554

(22) Filed: Oct. 9, 2007

(51) Int. Cl.
*G06Q 40/00* (2012.01)
*G06Q 40/08* (2012.01)
*G06Q 30/02* (2012.01)

(52) U.S. Cl.
CPC ............ *G06Q 40/08* (2013.01); *G06Q 30/02* (2013.01); *G06Q 30/0283* (2013.01)
USPC .................................................. 705/4; 705/35

(58) Field of Classification Search
CPC .... G06Q 40/08; G06Q 30/02; G06Q 30/0283
USPC ....................................................... 705/4, 35
See application file for complete search history.

(56) References Cited

U.S. PATENT DOCUMENTS

| 5,325,291 | A | 6/1994 | Garrett et al. | |
| 6,233,563 | B1* | 5/2001 | Jefferson et al. | 705/4 |
| 7,028,052 | B2* | 4/2006 | Chapman et al. | 1/1 |
| 2005/0154664 | A1* | 7/2005 | Guy et al. | 705/35 |

OTHER PUBLICATIONS

Unknown, Brief Explanation of Michigan No-Fault Insurance, May 13, 2005, pp. 1-3.*
Unknown, "Good credit? Use it to lower your car insurance", Sep. 16, 2007, Sun Journal (Lewiston, ME), C9.*
"Insurance Center: Save on Nevada Car Insurance With Our Sponsors," *Dmv.Org*, http://www.dmv.org/nv-nevada/car-insurance.php, downloaded 2007, 3 pages.
"Online Insurance Verification: Using Web services to verify auto insurance coverage," *Insurance Industry Committee on Motor Vehicle Administration*, Mar. 15, 2004, 13 pages.
"Standards for Monitoring Compulsory Auto Insurance and Financial Responsibility Laws," *National Association of Insurance Commissioners*, 2007, 6 pages.
"Vehicle Insurance Verification," *VeriSol*, http://www.verisol.com/, 2007, 1 page.

* cited by examiner

*Primary Examiner* — Kirsten Apple
*Assistant Examiner* — Scott S Trotter
(74) *Attorney, Agent, or Firm* — Brooks, Cameron & Huebsch, PLLC

(57) ABSTRACT

Systems, methods and apparatus for electronically verifying vehicle insurance coverage. A plurality of identifiers may be stored along with corresponding vehicle insurance coverage information for each of the identifiers. A query may be received requesting verification whether a vehicle operator has current vehicle insurance coverage. The query may include an identifier associated with the vehicle operator. The vehicle operator's identifier may be compared to the stored identifiers to verify whether the vehicle operator has current automobile insurance coverage. A signal may be communicated to a source of the query indicating a result of the comparison.

22 Claims, 7 Drawing Sheets

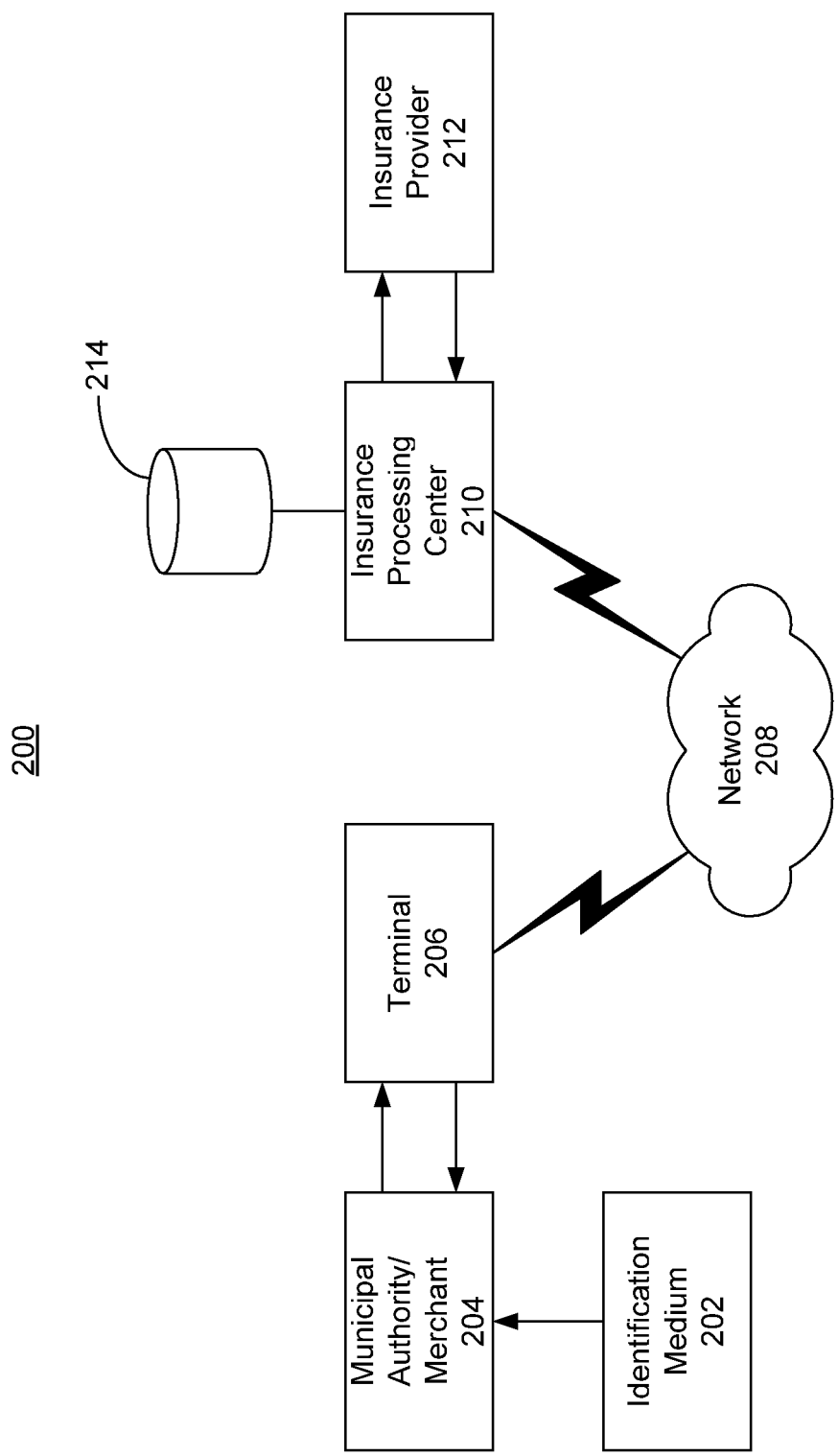

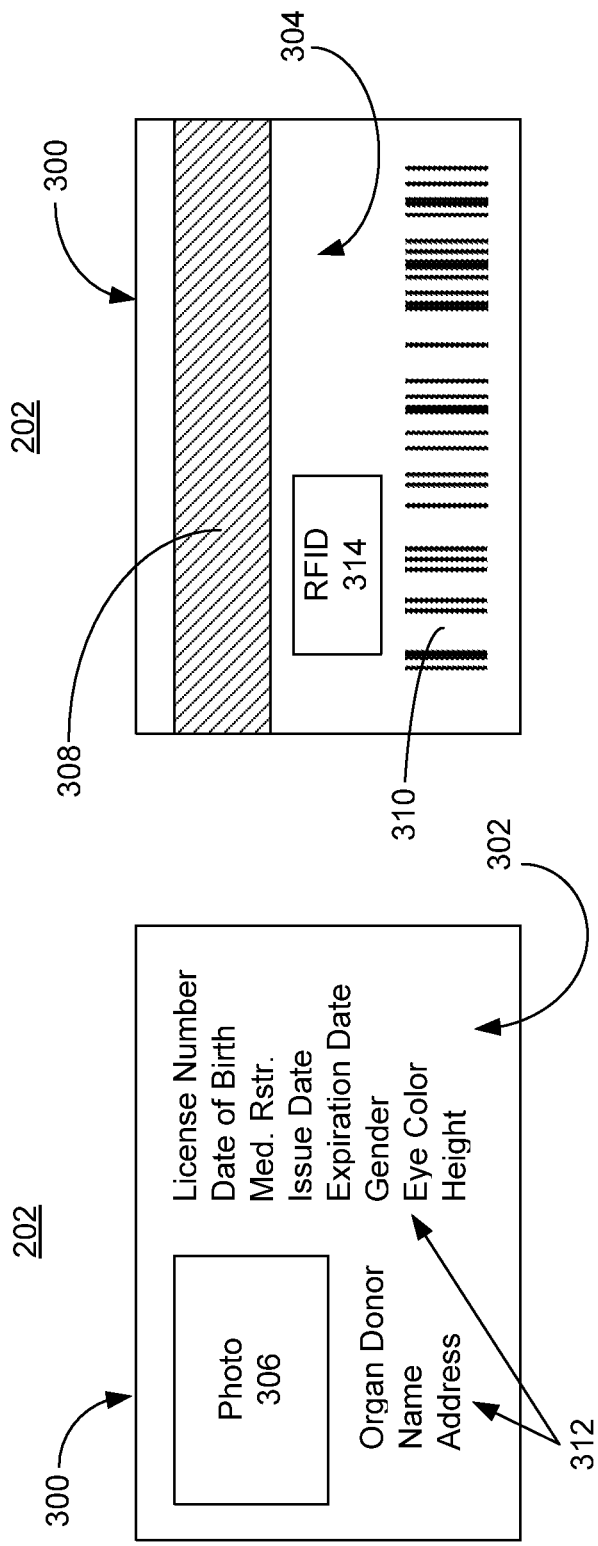

SYSTEMS AND METHODS FOR ELECTRONIC VERIFICATION OF VEHICLE INSURANCE COVERAGE

CROSS REFERENCE TO RELATED APPLICATIONS

This application is related by subject matter to the following commonly assigned applications, the entirety of which are hereby incorporated by reference herein: U.S. patent application Ser. No. 11/869,601, U.S. patent application Ser. No. 11/869,646, all filed on Oct. 9, 2007 and all entitled "ELECTRONIC VERIFICATION OF VEHICLE INSURANCE COVERAGE."

BACKGROUND

Vehicle owners are generally required by law to carry proof of insurance, in addition to a valid drivers license and vehicle registration, to legally operate their motor vehicles. The proof of insurance may be in the form of a paper insurance card issued by an insurance provider that is underwriting the insurance coverage. The insurance card may identify the name and address of the vehicle owner, the name of the insurance provider, the policy number, the effective date and the expiration date of the insurance coverage, the vehicle make, the vehicle model, the vehicle identification number (VIN), and the like.

A new insurance card is typically issued by an insurance provider each time a vehicle owner obtains a new insurance policy and/or renews his or her existing policy. However, it is not uncommon for an owner to forget to place the insurance card in the vehicle or to replace the expired insurance card with the new insurance card. As a result, if the owner is subsequently stopped by a law enforcement officer, the owner may not be able to produce valid proof of insurance. Furthermore, the officer may not have any other means of verifying insurance coverage. Consequently, the owner may incur civil penalties (e.g., pay a traffic fine) even though the owner may have current vehicle insurance coverage.

In addition, a vehicle owner may renew his or her insurance policy by paying only a portion of the insurance premiums, but may stop making payments upon receiving a new insurance card, thereby causing the policy to lapse before its official expiration date. The owner may, nonetheless, present the insurance card as proof of "current" insurance coverage to, for example, a department of motor vehicles official to obtain or renew a vehicle's registration. The official typically verifies the owner's insurance coverage simply by inspecting the expiration date listed on the insurance card. Thus, the official may not be able to determine at that point in time that the owner's insurance policy is in fact invalid, and the owner may renew the vehicle's registration and continue to operate his or her motor vehicle without any vehicle insurance coverage. This type of fraud may increase insurance costs for insured drivers, insurance providers, and federal, state and local governments. Moreover, it may increase the burden on taxpayers if a person injured by an uninsured driver does not have any insurance.

SUMMARY

The disclosed embodiments are directed to systems and methods for electronically verifying, in substantial real-time, whether a vehicle operator has current vehicle insurance coverage. In an embodiment, a plurality of personal identifiers associated with a plurality of vehicle operators may be stored electronically. In addition, current vehicle insurance coverage information for each of the stored personal identifiers may also be stored electronically. A query may be received via a communications network requesting verification whether a vehicle operator has current vehicle insurance coverage. The query may include a personal identifier associated with the vehicle operator. The vehicle operator's personal identifier may be compared to the plurality of stored personal identifiers to verify whether the vehicle operator has current automobile insurance coverage. A signal may be communicated to the source of the query indicative of the result.

In another embodiment, a personal identifier associated with a vehicle operator may be received. A server storing a plurality of personal identifiers may be queried to determine whether the vehicle operator has current vehicle insurance coverage. The server may also store current vehicle insurance coverage information for each of the stored personal identifiers. A response may be received from the server indicating whether the vehicle operator has current vehicle insurance coverage. The received response may then be output.

In yet another embodiment, a vehicle identifier may be received via a communications network. The received vehicle identifier may be compared to a plurality of vehicle identifiers stored in a data store to verify whether a vehicle associated with the received vehicle identifier is currently insured. A signal may be communicated indicating whether the vehicle is currently insured.

BRIEF DESCRIPTION OF THE DRAWINGS

The foregoing and other objects, aspects and advantages of the disclosed embodiments will be better understood from the following detailed description with reference to the drawings.

FIG. 2 is an example system in which vehicle insurance coverage may be electronically verified.

FIGS. 3A and 3B are illustrations of an example identification medium for storing identifiers associated with a vehicle and/or a vehicle operator.

DETAILED DESCRIPTION OF ILLUSTRATIVE EMBODIMENTS

The disclosed embodiments are described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1A:
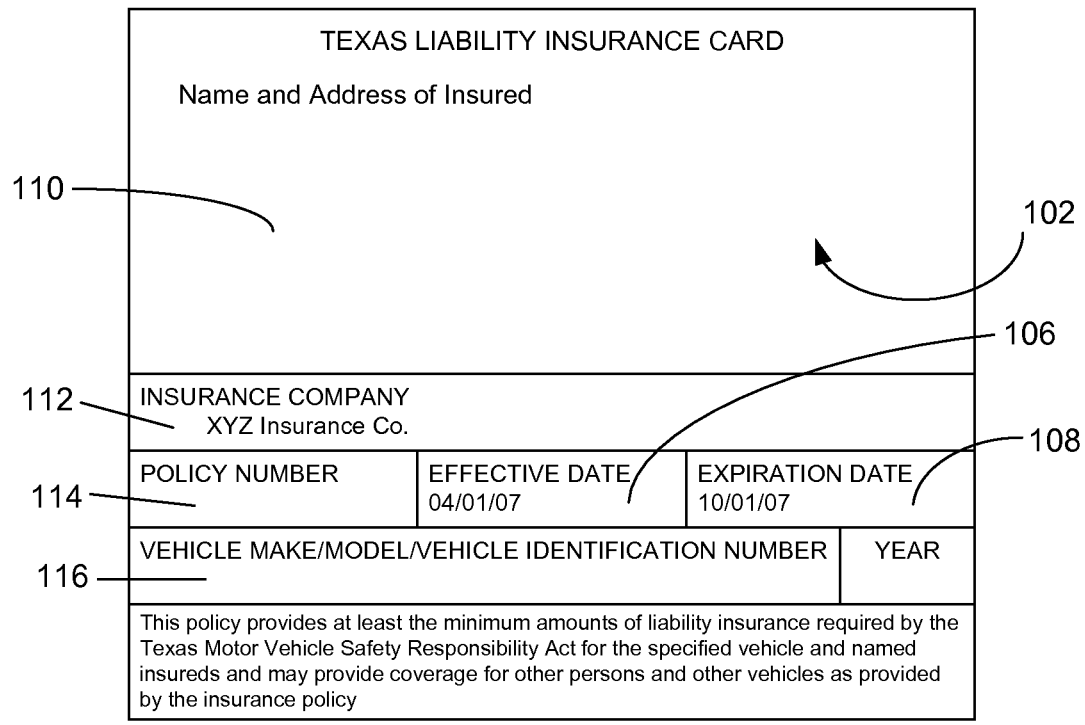
FIGS. 1A and 1B are illustrations of a prior art paper insurance card.
Figure 1B:
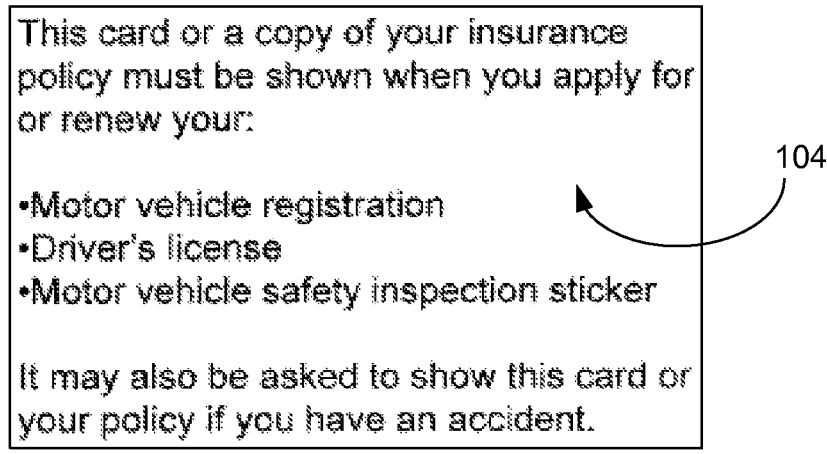

FIGS. 1A and 1B are illustrations of a prior art paper insurance card 100 having a front portion 102 and a back portion 104. As shown in FIG. 1A, the front portion 102 of the insurance card 100 may include a name section 110, which may include the name and address of an insured (i.e., the insurance policy owner). The front portion 102 may also include an insurance provider section 112 that that may identify the insurance company underwriting the insurance coverage, a policy number section 114 that may identify the insured's policy, and a vehicle identifier section 116 that may include the make, model and/or vehicle identification number (VIN) of the vehicle covered by the insurance policy. The front portion 102 may also include an effective date section 106 that may identify the date on which the policy became effective (i.e., the date on which insurance coverage begins) and a expiration date section 108 that may identify the date on which the policy is to expire.

As shown in FIG. 1B, the back portion 104 of the insurance card 100 may include text identifying how the insurance card 100 is to be used. For example, the text may indicate that the insurance card 100 may be presented as part of the process to renew the vehicle's registration, the vehicle owner's drivers license, and/or the vehicle's safety inspection sticker. The text on the back portion 104 may further indicate that the insurance card 100 may be presented if an operator of the vehicle is involved in an accident.

The insurance card 100 is typically issued by the insurance provider when the vehicle's insurance policy is purchased or renewed. A vehicle operator (i.e., the vehicle owner and/or current driver of the vehicle) often stores the insurance card 100 in the vehicle, such as in the vehicle's glove compartment or glovebox. As noted above, upon receiving the insurance card 100 from the insurance provider, it is not uncommon for the vehicle operator to forget to place the insurance card 100 in the vehicle. This may cause the vehicle operator to incur a traffic fine if he or she is later stopped by a law enforcement official and is unable to produce proof of current vehicle insurance coverage.

In addition, the insurance card 100 may be presented to an official or agent at a department of motor vehicles as proof of insurance when renewing the vehicle's registration. The official may verify that the vehicle operator has current vehicle insurance simply by visually inspecting, among other things, the effective date section 106 and the expiration date 108 on the insurance card 100. Upon determining that the vehicle operator has current vehicle insurance coverage based on the dates printed on the insurance card 100, the official may renew the vehicle's registration. However, as further noted above, the vehicle operator may have ceased paying the premiums on the insurance policy. As a result, the vehicle operator may be able to provide a "current" insurance card as proof of insurance even though the vehicle's insurance coverage has in fact lapsed.

FIG. 2 is a diagram of an example system 200 for electronically verifying vehicle insurance coverage in substantial real-time. As shown in FIG. 2, the system 200 may include an identification medium 202, a municipal authority/merchant 204, a terminal 206, a insurance processing center 210, and an insurance provider 212. The identification medium 202 may be a card or other suitable apparatus capable of being used for personal identification. For example, identification medium 202 may be a drivers license, a social security card, a passport, and/or a military identification card that may be easily carried in a wallet, purse, and/or pocket of a vehicle operator. It will be appreciated that the identification medium 202 may also be an insurance card that may be issued by an insurance provider. As will be further discussed below, the identification medium 202 may include an information storage component, such a magnetic strip, a bar code, and/or a radio frequency identification (RFID) transponder or tag. The information storage component on the identification medium 202 may, for example, magnetically, graphically, or electronically store personal and/or vehicle identifier information associated with a vehicle operator.

The municipal authority/merchant 204 may include law enforcement officials, departments of motor vehicles, and/or merchants that provide vehicle registration, vehicle inspections, and/or drivers license services on behalf of state and local governments. The municipal authority/merchant 204 may be associated with the state in which the vehicle operator resides and/or the state in which the vehicle is registered. The municipal authority/merchant 204 may possess and/or have access to the terminal 206, which may be any type of apparatus or device that is capable of interfacing with the identification medium 202 to access the information stored thereon. The terminal 206 may be a card terminal, a portable electronic terminal, an internet terminal, a wireless terminal, and the like. In particular, the terminal 206 may be a general purpose and/or a special purpose computing device, such as a desktop personal computer (PC), a laptop PC, a personal digital assistant (PDA), a cellular telephone, a credit card terminal, and the like. The terminal 206 may include an interface component for reading information stored on the identification medium 202. For example, the terminal 206 may include a magnetic strip reader, a bar code scanner, and/or a RFID reader.

The terminal 206 may be in communication with the insurance processing center 210 via a communications network 208. The communications network 208 may be any suitable network, such as a local-area-network (LAN), a wide-area-network (WAN), an Intranet, the Internet, a public switched telephone network (PSTN), a cellular network, a Voice over Internet Protocol (VoIP) Network, and the like.

The insurance processing center 210 may include one or more data stores 214 for storing identifiers, each of which may correspond to a vehicle and/or vehicle operator. For example, each identifier may include a vehicle operator's name, address, drivers license number, insurance policy number, VIN, social security number, date of birth, and the like. The insurance processing center 210 may further store current vehicle insurance coverage information for each identifier. For example, the insurance processing center 210 may store the type of insurance (e.g., coverage for bodily injury, property damage, uninsured third parties, underinsured third parties, etc.) and the coverage amount carried by each vehicle operator that is associated with a stored identifier. The insurance processing center 210 may also store the effective and expiration dates of each vehicle insurance policy. Thus, the vehicle insurance coverage information may indicate whether a particular insurance policy is active or has lapsed.

The insurance processing center 210 may be in communication with one or more insurance providers 212 via any appropriate network, such as the communications network 208. Each insurance provider 212 may periodically provide updated information to the insurance processing center 210. For example, an insurance provider 212 may direct and/or cause the insurance processing center 210 to update the data store 214 to reflect changes in vehicle insurance coverage for one of its customers (e.g., a vehicle operator). More specifically, the insurance provider 212 may provide information to the insurance processing center 210 that one of its vehicle operator's insurance coverage has lapsed for lack of payment, though it will be appreciated that the insurance provider 212 may cause the insurance processing center 210 to update any and all information that is being stored in the data store 214. Thus, by periodically and/or continually updating the data store 214, a vehicle operator's vehicle insurance coverage may be verified electronically in substantial real-time (e.g., the data store 214 may be electronically accessed to determine within minutes whether the vehicle operator's insurance policy is currently active or has lapsed).

FIGS. 3A and 3B are illustrations of an example identification medium 202. As shown in FIGS. 3A and 3B, the identification medium 202 may be a drivers license 300 issued by a government or private agency, though it will be appreciated that the identification medium 202 may be any suitable card or apparatus that can serve as a means for personal identification. The drivers license 300 may include a front portion 302 and a back portion 304. The front portion 302 of the drivers license 300 may include a photo 306 of the vehicle operator and information 312, which may correspond to the vehicle operator. For example, as shown in FIG. 3A, the information 312 may include the vehicle operator's organ donor information, name, address, drivers license number, date of birth, medical restrictions, drivers license issue date, drivers license expiration date, gender, eye color and/or height, though other types and forms of personal identification are also consistent with an embodiment, such as the vehicle operator's social security number.

The back portion 304 of the drivers license 300 may include a magnetic strip 308, a bar code 310, and/or a RFID transponder 314, though it will be appreciated that any or all of the foregoing components may be located on the front portion 302. The magnetic strip 308, the bar code 310, and/or RFID transponder 314 collectively, or individually, may store at least a portion of the information 312 found on the front portion 302 of the drivers license 300. In addition to, or in lieu of, the information 312, the magnetic strip 308, the bar code 310, and/or the RFID transponder 314 may also store vehicle information and insurance information, such as the vehicle make, model, VIN, and/or an insurance policy number.

The drivers license 300 may be utilized by various individuals and/or systems to electronically verify, in substantial real-time, whether a vehicle operator associated with the drivers license 300 has current vehicle insurance coverage. Vehicle insurance coverage may be verified as part of any process to renew a vehicle's registration, obtain a new license plate, obtain a vehicle inspection sticker, and the like, or as proof of insurance during a traffic stop by a law enforcement official.

For example, when renewing a vehicle's registration, the vehicle operator may present his or her drivers license 300 to the municipal authority/merchant 204 (e.g., an agent at a department of motor vehicles or at a private merchant authorized by the state in which the vehicle operator resides or the vehicle is registered) as proof of insurance. To verify that the vehicle operator's vehicle insurance coverage is in fact current (i.e., has not lapsed), the municipal authority/merchant 204 may electronically interface the drivers license 300 with the terminal 206 to access an identifier (e.g., a portion or all of the information 312) electronically stored on the drivers license 300 via at least one of the magnetic strip 308, the bar code 310, and/or the RFID transponder 314. Alternatively, the municipal authority/merchant 204 may manually enter the identifier into the terminal 206 via an input component, such as a keyboard or touch screen.

After inputting the identifier into the terminal 206 (either electronically or manually), the municipal authority/merchant 204 may transmit the identifier to the insurance processing center 210 via the communications network 208 to verify whether the vehicle operator's vehicle insurance coverage is current. The insurance processing center 210 may compare the received identifier to its stored identifiers to determine if there is a match. If the received identifier does not match any of the stored identifiers, the insurance processing center 210 may transmit a response to the terminal 206 indicating that there is no record of the received identifier in the data store 214 (i.e., the vehicle operator associated with the received identifier does not appear to have current vehicle insurance coverage). In alternate embodiments, the insurance processing center 210 may relay the identifier directly to the appropriate insurance provider 212, which may then verify whether the vehicle operator's vehicle insurance coverage is current.

If the received identifier matches one of the stored identifiers in the data store 214, the insurance processing center 210 may access the vehicle insurance coverage information associated with the received identifier. If the information associated with the received identifier indicates that the vehicle operator's vehicle insurance coverage is either current or that it has lapsed, the insurance processing center 210 may transmit an appropriate response to the terminal 206.

Upon receiving the response from the insurance processing center 210, the municipal authority/merchant 204 may approve or deny the vehicle operator's request to renew his or her vehicle's registration based on the response. For example, the municipal authority/merchant 204 may renew the vehicle's registration if the response from the insurance processing center 210 is positive (i.e., the vehicle operator has current vehicle insurance coverage). Conversely, the municipal authority/merchant 204 may not renew the vehicle's registration if the response from the insurance processing center 210 is negative (i.e., the vehicle operator is without current vehicle insurance coverage). It will be appreciated that the municipal authority/merchant 204 may grant or deny any action on the basis of the response from the insurance processing center 210. For example, the municipal authority/merchant 204 may decide whether to renew the vehicle operator's drivers license or to provide a new license plate to the vehicle operator based on the response received from the insurance processing center 210.

In addition to storing vehicle insurance coverage information, the insurance processing center 210 may maintain a record in the data store 214 of each query related to the received identifier. In particular, the insurance processing center 210 may maintain a record of the source and/or frequency of the queries. Thus, the records in the data store 214 of the insurance processing center 210 may indicate, for example, that six queries were received during a predetermined time period. The records in the data store 214 may further indicate that of the six queries, four were from law enforcement officials. It will be appreciated that the terminal 206 may also maintain one or more of the above records.

By maintaining such records, the insurance processing center 210 may further be configured to automatically generate and transmit an alert based on the number and/or source of the queries. For example, the insurance processing center 210 may generate and transmit an alert to the insurance provider 212 and/or the municipal authority/merchant 204 if a predetermined number of queries have been received for a particular identifier during a predetermined time period (e.g., more than six queries in a three-month period), or if a predetermined number of queries have been received from a particular source (e.g., more than three queries from one or more law enforcement officials). The insurance provider 212 and/or the municipal authority/merchant 204 may use the alert as part of its normal business operations. For example, the insurance provider 212 may use the alert as part of its risk assessment for setting insurance premiums for its customers.

Figure 4:
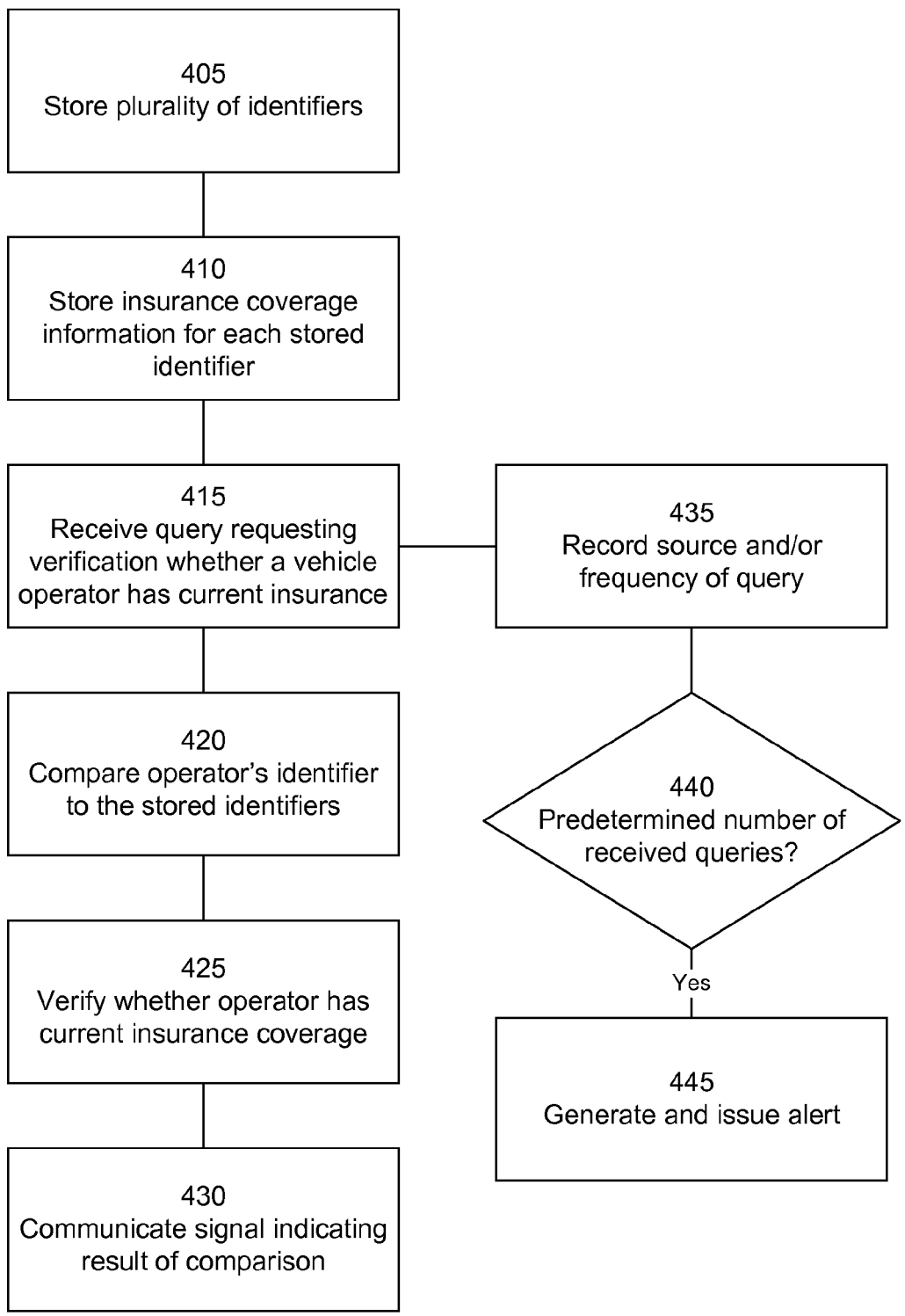
FIGS. 4, 5 and 6 are flowcharts illustrating example methods for electronically verifying vehicle insurance coverage.
Figure 5:
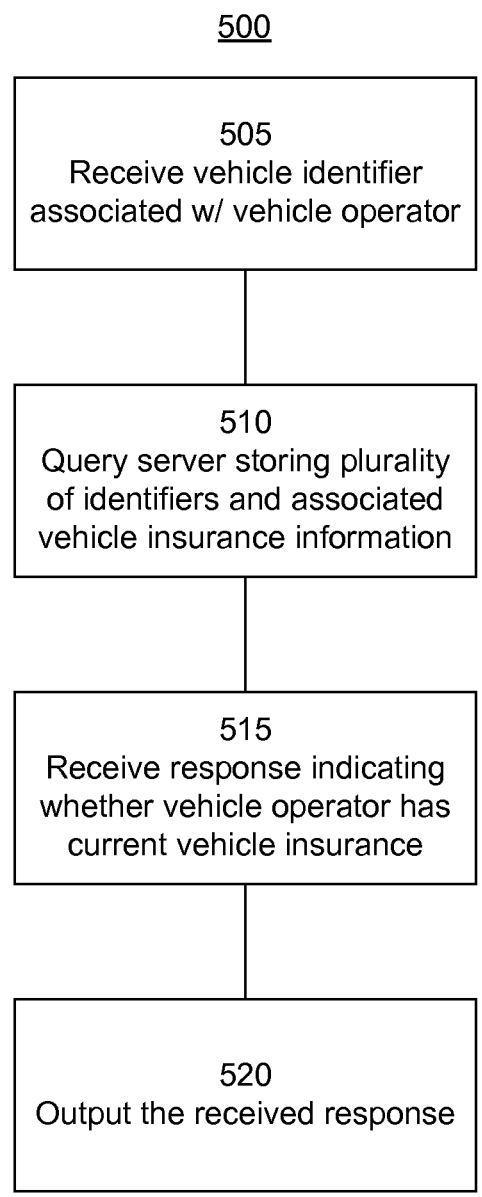
Figure 6:
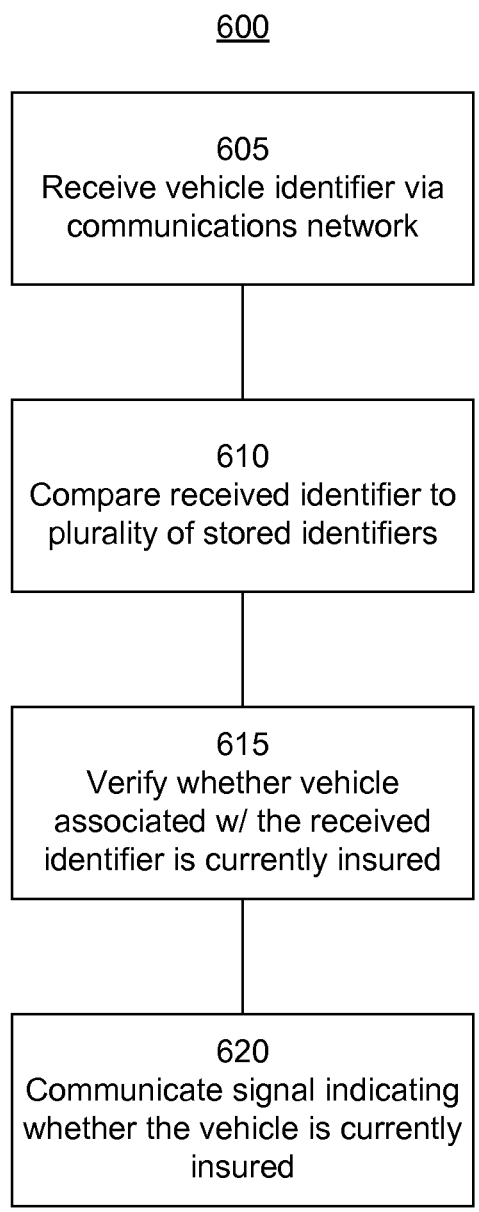

FIGS. 4, 5 and 6 are flowcharts illustrating example methods 400, 500 and 600, respectively, for electronically verifying, in substantial real-time, vehicle insurance coverage. As shown in FIG. 4, at 405, the insurance processing center 210 may store one or more identifiers in the data store 214, each identifier being associated with a vehicle operator. At 410, the insurance processing center 210 may further store vehicle insurance coverage information for each of the stored identifiers. The vehicle insurance coverage information may be supplied to the insurance processing center 210 and periodically updated by one or more insurance providers 212.

At 415, the insurance processing center 210 may receive a query via the communications network 208 from the municipal authority/merchant 204 requesting verification whether a particular vehicle operator has current vehicle insurance coverage. For example, the vehicle operator may have been pulled over by a law enforcement official during a routine traffic stop. Upon receiving the vehicle operator's drivers license 300, the law enforcement official may interface the drivers license 300 with the terminal 206, which may be installed in the law enforcement official's patrol car. The terminal 206 may read the vehicle operator's identifier electronically stored on the drivers license 300. The terminal 206 may then send the query to the insurance processing center 210. The query may include the identifier read from the drivers license 300.

At 420, the insurance processing center 210 may compare the received identifier to the identifiers stored in the data store 214. At 425, the insurance processing center 210 may verify whether the particular vehicle operator has current automobile insurance coverage based on a result of the comparison. At 430, the insurance processing center may then communicate a signal indicative of the result to the municipal authority/merchant 204 (e.g., the law enforcement official) that sent the query. Based on the response received from the insurance processing center 210, the municipal authority/merchant 204 may obtain electronic verification, in substantial real-time, whether the vehicle operator has current vehicle insurance coverage.

At 435, the insurance processing center 210 may also maintain a record of the source and/or frequency of the queries received from the municipal authority/merchant 204. Thus, at 440, the insurance processing center 210 may determine if a predetermined number of queries have been received within a predetermined period of time or from a predetermined source. At 445, the insurance processing center 210 may generate and transmit an alert to one or both of the municipal authority/merchant 204 and the insurance provider 212 if a predetermined number of queries have been received.

FIG. 5 illustrates another example method for electronically verifying vehicle insurance coverage. At 505, the municipal authority/merchant 204 may receive an identifier associated with a vehicle operator via the terminal 206. For example, the terminal 206 may read the identifier stored on the magnetic strip 308, the bar code 310, and/or the RFID tag 314 on the vehicle operator's drivers license 300.

At 510, the terminal 206 may query a server or data store 214 at the insurance processing center 210 to determine whether the vehicle operator has current vehicle insurance coverage. The server or data store 214 may store any number of identifiers and current vehicle insurance coverage information for each of the stored personal identifiers. At 515, the terminal 206 may receive a response from the insurance processing center 210 indicating whether the vehicle operator has current vehicle insurance coverage. At 520, the terminal 206 may output the response to an agent or official associated with the municipal authority/merchant 204. For example, the response may be output via a visual display, such as a display connected to the terminal 206.

As noted above, the municipal authority/merchant 204 may grant or deny a request based on the received response. For example, if the vehicle operator is attempting to renew his or her vehicle registration, the municipal authority/merchant 204 may only renew the vehicle operator's registration if the insurance processing center 210 sends a response verifying that the vehicle operator has current vehicle insurance coverage. In another embodiment, the municipal authority/merchant 204 may take a specific action based on the received response. For example, a law enforcement official may issue the vehicle operator a traffic fine if the insurance processing center 210 sends a response indicating that the vehicle operator is without current vehicle insurance coverage.

FIG. 6 illustrates yet another example method for electronically verifying vehicle insurance coverage. At 605, the insurance processing center 210 may receive a vehicle identifier via the communications network 208. The vehicle identifier may include the vehicle make, model, and/or VIN. At 610, the insurance processing center 210 may compare the received vehicle identifier to one or more vehicle identifiers stored in the data store 214. The data store 214 may also store current vehicle insurance coverage information for each of the stored vehicle identifiers. At 615, the insurance processing center 210 may verify whether a vehicle associated with the received vehicle identifier is currently insured based on a result of the comparison. At 620, the insurance processing center 210 may communicate a signal indicating whether the vehicle is currently insured. The signal may be communicated to one or both of the municipal authority/merchant 204 and the insurance provider 212.

Figure 7:
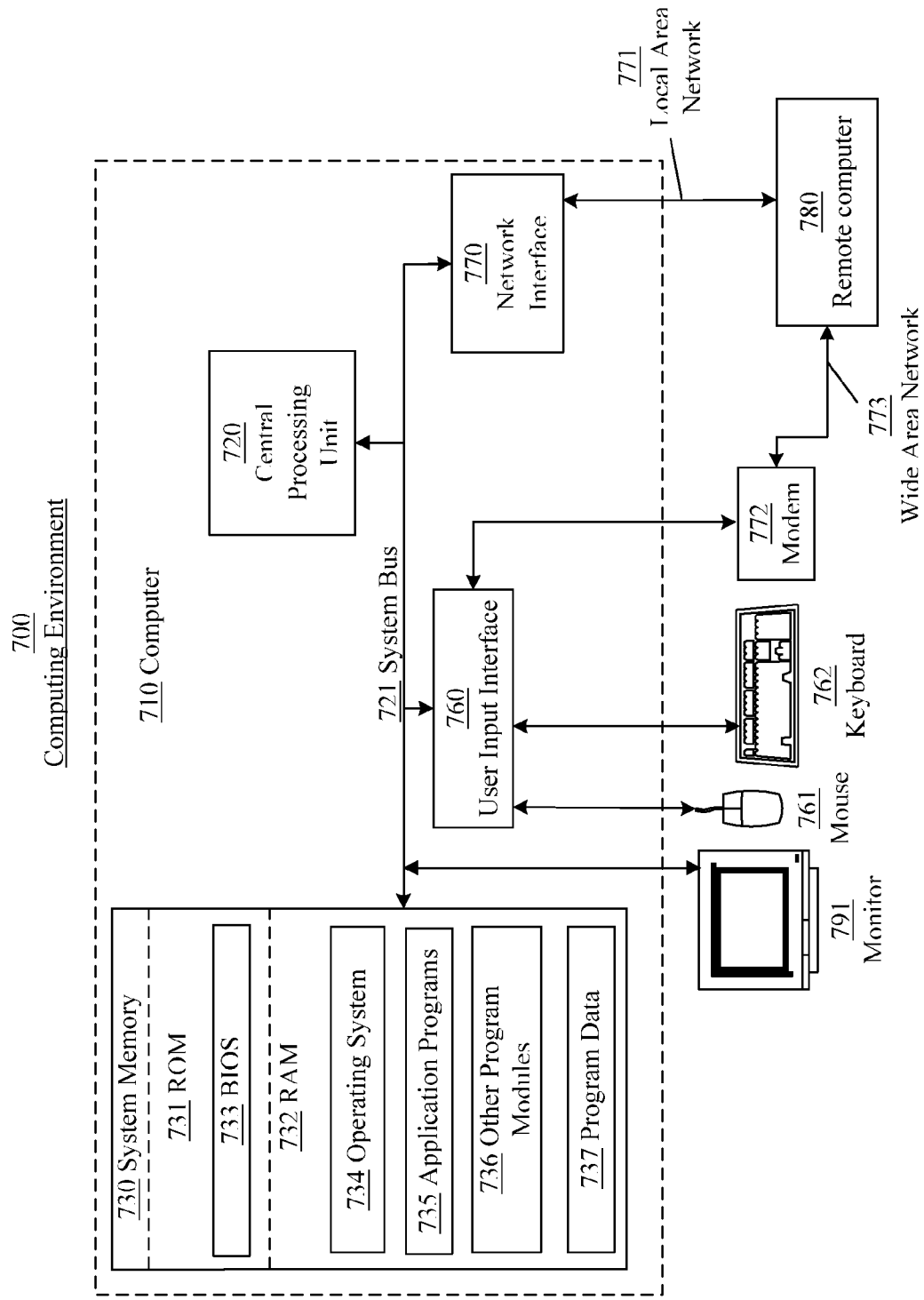
FIG. 7 is a block diagram showing an exemplary computing environment in which aspects of one or more embodiments may be implemented.

FIG. 7 depicts an example computing environment 700 in which aspects of one or more embodiments may be implemented. The computing environment 700 may include a general purpose computing device in the form of a computer 710, a monitor 791, and other input or output devices such as a mouse 761, a keyboard 762, and a modem 772. Components of the computer 710 may include a central processing unit 720, a system memory 730, and a system bus 721 that couples various system components including the system memory to the processing unit 720. Computers and computing environments such as the computer 710 and the computing environment 700 are known to those skilled in the art and thus are briefly described here.

The system memory 730 may include computer storage media in the form of volatile and/or nonvolatile memory such as ROM 731 and RAM 732. A basic input/output system 133 (BIOS) containing the basic routines that help to transfer information between elements within the computer 710, such as during start-up, may be stored in the ROM 731. The RAM 732 typically contains data and/or program modules that are immediately accessible to and/or presently being operated on by the central processing unit 720. The system memory 730 additionally may include, for example, an operating system 734, application programs 735, other program modules 736, and program data 737.

The disclosed embodiments may be implemented in the computing environment 700 in the form of any of a variety of computer readable media. Computer readable media can be any media that can be accessed by the computer 710, including both volatile and nonvolatile, removable and non-removable media.

The computer 710 may operate in a networked environment using logical connections to one or more remote computers, such as a remote computer 780. The remote computer 780 may be a personal computer, a server, a router, a network personal computer, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments may be common in offices, enterprise-wide computer networks, intranets, and the Internet.

When used in a LAN networking environment, the computer 710 may be connected to the LAN 771 through a network interface 770. When used in a WAN networking environment, the computer 710 may include a modem 772 for establishing communications over the WAN 773, such as the Internet. The modem 772 may be connected to the system bus 721 via the user input interface 760, or other appropriate mechanism.

A computer 710 or other client device can be deployed as part of a computer network. In this regard, the disclosed embodiments pertain to any computer system having any number of memory or storage units, and any number of applications and processes occurring across any number of storage units or volumes. The disclosed embodiments may apply to an environment with server computers and client computers deployed in a network environment, having remote or local storage. The disclosed embodiments may also apply to a standalone computing device, having programming language functionality, interpretation and execution capabilities.

The various techniques described herein may be implemented with hardware or software or, where appropriate, with a combination of both. Thus, the system, methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing one or more of the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described systems, methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing one or more of the disclosed embodiments. When implemented on a general-purpose processor, the program code combines with the processor to provide a unique apparatus that operates to perform the processing of one or more disclosed embodiments.

While the embodiments have been described in connection with the disclosed embodiments of the various figures, it is to be understood that other similar embodiments may be used or modifications and additions may be made to the disclosed embodiment for performing the same function without deviating therefrom. Therefore, the disclosed embodiments should not be limited to any single embodiment, but rather should be construed in breadth and scope in accordance with the appended claims.

What is claimed:

1. A system for electronically verifying vehicle insurance coverage, the system comprising:
   a memory; and
   a processing unit coupled to the memory, wherein the processing unit is configured to:
   store a plurality of identifiers, each associated with one of a plurality of vehicle operators;
   store current vehicle insurance coverage information for each of the stored identifiers, wherein the current vehicle insurance coverage information is updated to reflect changes in vehicle insurance coverage for each of the stored identifiers;
   receive a query via a communications network requesting verification whether a first vehicle operator has current vehicle insurance coverage, wherein the query includes an identifier associated with the first vehicle operator;
   compare the first vehicle operator's identifier to the plurality of stored identifiers;
   verify whether the first vehicle operator has current vehicle insurance coverage based on a result of the comparison;
   communicate a signal indicative of the result to a source of the query;
   maintain a record of a source and frequency from the source of each query requesting verification whether the first vehicle operator has current insurance coverage;
   communicate an alert to an insurance provider indicating that a predetermined number of queries, requesting verification whether the first vehicle operator has current vehicle insurance coverage, have been received from the source during a pre-determined time period; and
   calculate an insurance premium based on a risk assessment that is calculated using the alert.

2. The system of claim 1, wherein the communicated signal indicates that the vehicle operator has current vehicle insurance coverage.

3. The system of claim 1, wherein the communicated signal indicates that the vehicle operator is without current vehicle insurance coverage.

4. The system of claim 1, wherein the vehicle insurance coverage insures against at least one of bodily injury, property damage, uninsured third parties, or underinsured third parties.

5. The system of claim 1, wherein the received identifier of the first vehicle operator is stored on an article carried on the person of the first vehicle operator.

6. The system of claim 5, wherein the article comprises one of a driver's license, a social security card, a passport, or a military identification card.

7. The system of claim 1, wherein the record of each query indicates a particular source for each of the queries, and the alert is communicated when the predetermined number of queries is from one of the particular source.

8. A computer-readable medium having stored thereon computer-executable instructions for electronically verifying vehicle insurance coverage, the computer-executable instructions comprising instructions for:
   storing a plurality of identifiers, each associated with one of a plurality of vehicle operators;
   storing current vehicle insurance coverage information for each of the stored identifiers, wherein the current vehicle insurance coverage information is updated to reflect changes in vehicle insurance coverage for each of the stored identifiers;

receiving a query via a communications network requesting verification whether a first vehicle operator has current vehicle insurance coverage, wherein the query includes an identifier associated with the first vehicle operator;

comparing the first vehicle operator's identifier to the plurality of stored identifiers;

verifying whether the first vehicle operator has current vehicle insurance coverage based on a result of the comparison;

communicating a signal indicative of the result to a source of the query maintaining a record of a source and frequency from the source of each requesting verification whether the first vehicle operator has current insurance coverage; and communicating an alert to an insurance provider indicating that a predetermined number of queries, requesting verification whether the first vehicle operator has current vehicle insurance coverage, have been received from the source during a pre-determined time period; and calculate an insurance premium based on a risk assessment that is calculated using the alert.

9. The computer-readable medium of claim 8, wherein the communicated signal indicates that the vehicle operator has current vehicle insurance coverage.

10. The computer-readable medium of claim 8, wherein the communicated signal indicates that the vehicle operator is without current vehicle insurance coverage.

11. The computer-readable medium of claim 8, wherein the received identifier of the first vehicle operator is stored on an article carried on the person of the first vehicle operator.

12. The computer-readable medium of claim 8, wherein the computer executable instructions further comprise instructions for indicating a particular source for each of the queries, and the alert is communicated when the predetermined number of queries is from one of the particular source.

13. A method for electronically verifying vehicle insurance coverage, the method comprising:

storing with a computer having a processing unit and computer readable media executable by the processing unit a plurality of identifiers, each associated with one of a plurality of vehicle operators;

storing with the computer current vehicle insurance coverage information for each of the stored identifiers, wherein the current vehicle insurance coverage information is updated to reflect changes in vehicle insurance coverage for each of the stored identifiers;

receiving with the computer a query via a communications network requesting verification whether a first vehicle operator has current vehicle insurance coverage, wherein the query includes an identifier associated with the first vehicle operator;

comparing with the computer the first vehicle operator's identifier to the plurality of stored identifiers;

verifying with the computer whether the first vehicle operator has current vehicle insurance coverage based on a result of the comparison; and communicating with the computer a signal indicative of the result to a source of the query;

maintaining with the computer a record of a source and frequency from the source of each query requesting verification whether the first vehicle operator has current insurance coverage; and communicating with the computer an alert to an insurance provider indicating that a predetermined number of queries, requesting verification whether the first vehicle operator has current vehicle insurance coverage, have been received from the source during a pre-determined time period; and calculate an insurance premium based on a risk assessment that is calculated using the alert.

14. The method of claim 13, wherein the communicated signal indicates that the vehicle operator has current vehicle insurance coverage.

15. The method of claim 13, wherein the communicated signal indicates that the vehicle operator is without current vehicle insurance coverage.

16. The method of claim 13, wherein the received identifier of the first vehicle operator is stored on an article carried on the person of the first vehicle operator.

17. The method of claim 13 further comprising indicating a particular source for each of the queries, and communicating the alert when the predetermined number of queries is from one of the particular source.

18. The method of claim 17 where the particular source is a law enforcement official.

19. The computer-readable medium of claim 8, wherein the vehicle insurance coverage insures against at least one of bodily injury, property damage, uninsured third parties, or underinsured third parties.

20. The computer-readable medium of claim 11, wherein the article comprises one of a drivers license, a social security card, a passport, or a military identification card.

21. The method of claim 13, wherein the vehicle insurance coverage insures against at least one of bodily injury, property damage, uninsured third parties, or underinsured third parties.

22. The method of claim 16, wherein the article comprises one of a drivers license, a social security card, a passport, or a military identification card.

* * * * *